Oct. 26, 1926.  
F. L. O. WADSWORTH  
1,604,207  
SERIES SPRING SUSPENSION SYSTEM  
Filed Dec. 18, 1922  
2 Sheets-Sheet 1

Inventor:  
F. L. O. Wadsworth

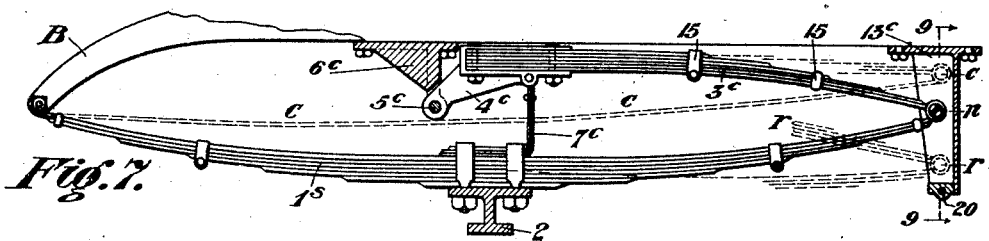
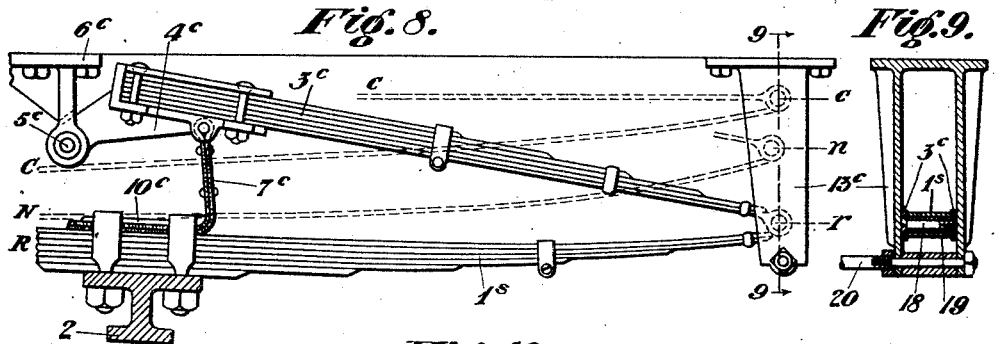
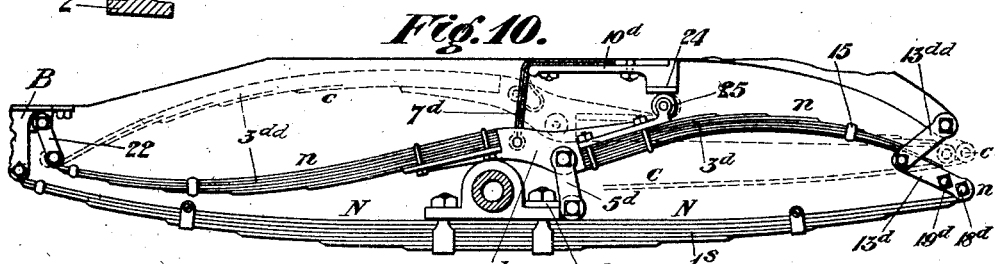
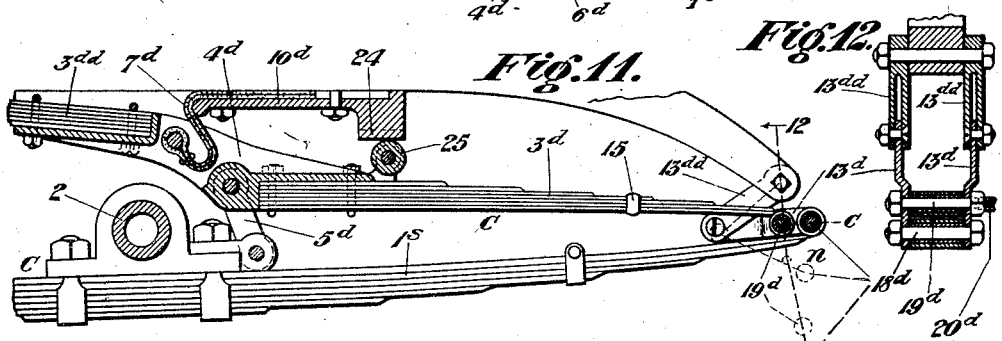
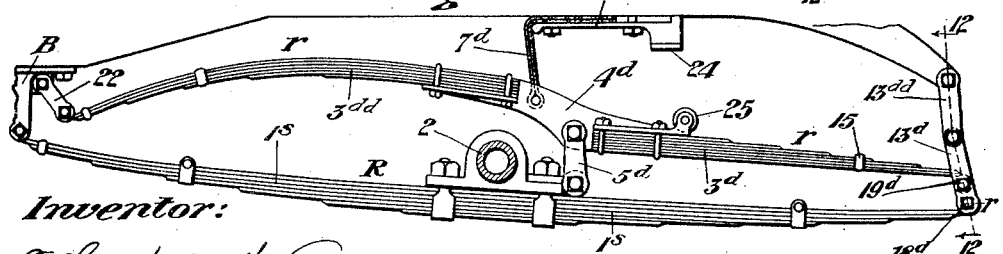

Patented Oct. 26, 1926.

1,604,207

UNITED STATES PATENT OFFICE.

FRANK L. O. WADSWORTH, OF PITTSBURGH, PENNSYLVANIA.

SERIES SPRING-SUSPENSION SYSTEM.

Application filed December 18, 1922. Serial No. 607,495.

My invention relates to improvements in the type of spring suspension system which comprise a plurality of elastic or resilient supports that are operatively conjoined or coupled in permanent series relationship and are subjected to superimposed or progressively increased flexural strains whenever the system is subjected to either compression or expansion stresses. The present application is, in part, a continuation of my pending applications Ser. Nos. 400,256 and 591,708 filed respectively July 20, 1920, and Oct. 2, 1922; and the general characteristics and advantages of this type of shock absorber construction are set forth in these earlier disclosures.

The specific object of my present improvements is to provide a simple and efficient combination of series-connected leaf springs which resembles in general form and outline either an ordinary full elliptic, or a three-quarter elliptic, spring support; but which is adapted, not only to elastically cushion and absorb the effects of an increased load stress—i. e., of compressive shock—but also to elastically resist and quickly check any rebound, or separation of the spring supported parts, beyond normal load position.

Another particular purpose of these improvements is the provision of a self contained supplemental leaf spring unit which may be interposed between the end, or ends, of an ordinary leaf spring member and that part of the vehicle to which said end, or ends, is usually connected, without any sensible modification or alteration of the other parts of the suspension organization; and without substantially increasing the bulk or weight of the standard forms of spring support with which such a unit may be used.

A further specific object of my improvements is to provide a supplemental spring unit which can be utilized, in conjunction with either a cross leaf spring, or a side leaf spring, to prevent any sensible end sway or axial oscillation in the plane of the suspension system; and which will therefore—when applied to a cross leaf spring—arrest any side swing or lateral displacement of the vehicle body or tonneau with respect to its axle or running gear supports.

Figure 1:
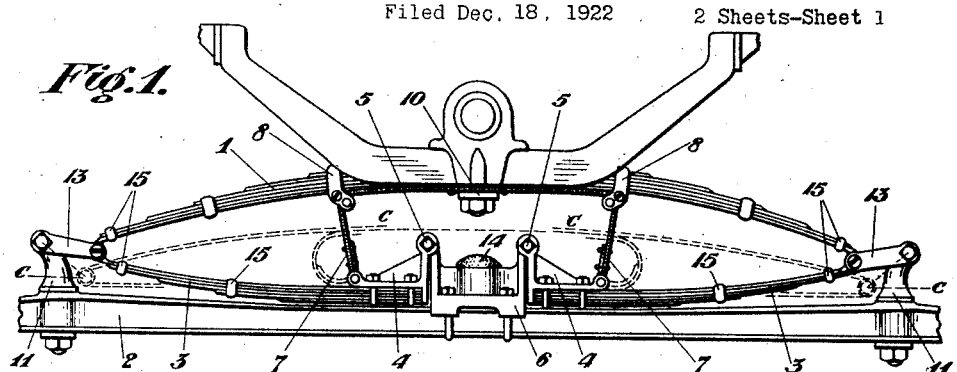
Figure 2:
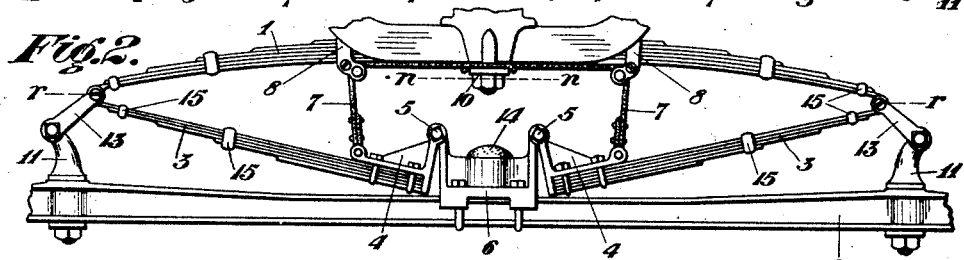
Figure 3:
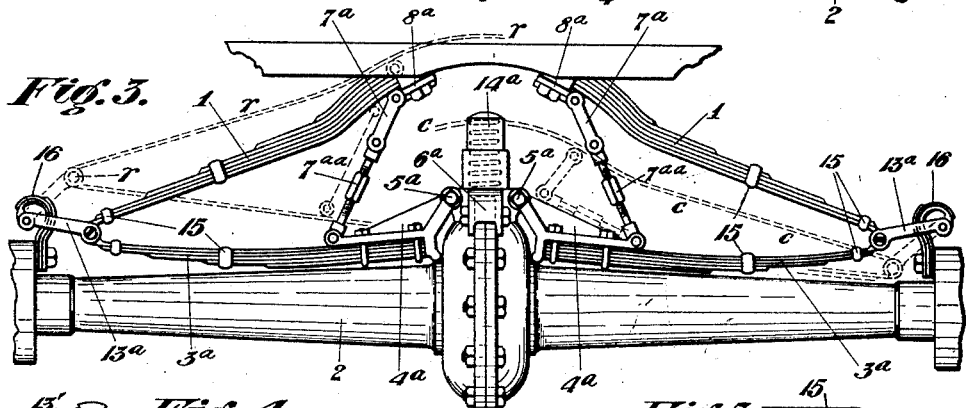
Figures 4, 5, 6:
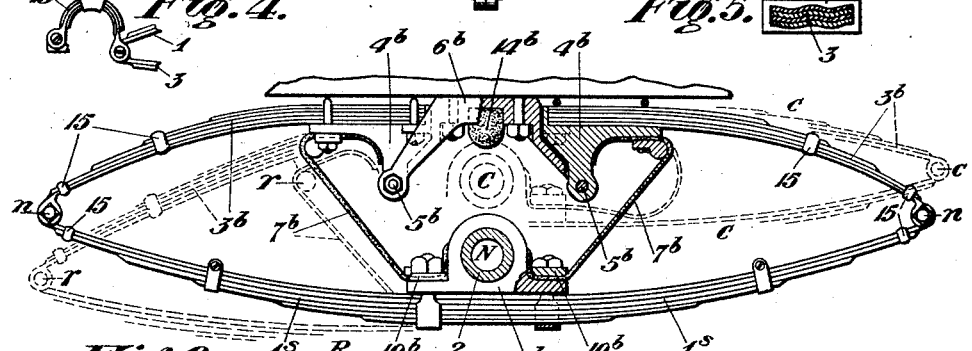

Other special features and advantages of various forms of my improved supplemental leaf spring construction—as used in combination with particular types of main spring supports—will be readily recognized and appreciated, by those skilled in this art, after an examination of the illustrative embodiments of my invention which are depicted in the accompanying drawings and are hereinafter described. In these drawings:

Fig. 1 is a front elevation of one of my improved series spring suspension systems as applied to the front axle mounting of a Ford car; Fig. 2 is a similar view of the same organization with the parts thereof in the position of extreme rebound; Fig. 3 is a rear elevation of another form of my improvements applied to the rear axle support of this type of car; Fig. 4 is a detail view of a modified form of guide link which may be used in conjunction with either of the foregoing constructions; Fig. 5 is an enlarged cross section through a modified form of supplemental spring element; Fig. 6 is a side view—partially in section—of a third exemplification of my invention; Fig. 7 is another side view of a fourth exemplification; Fig. 8 is an enlarged elevation of a part of the organization shown in Fig. 6 but with the parts of the system in an expanded position; Fig. 9 is a cross section on the plane 9—9 of Figs. 7 and 6; Fig. 10 illustrates still another series spring suspension which partially embodies my present improvements; Fig. 11 is a somewhat enlarged sectional elevation of a portion of the complete system shown in Fig. 9 with the parts of this system in a compressed position; Fig. 12 is a cross section on the plane 12—12 of Figs. 11 and 13; and Fig. 13 is a view like that of Fig. 10, but with the parts in the positions assumed under an expansion stress.

In the form of construction shown in Figs. 1 and 2 the cross leaf main spring 1 is rigidly secured at its center to the body of the car; and its outer eye ends—which are ordinarily suspended on the axle perches by swinging shackle links—are elastically supported on the extremities of two reversely turned supplemental leaf springs 3—3 that are bolted, at their adjacent ends, to short L-shaped levers 4, 4. These unitary lever-spring members are pivotally mounted on a U-shaped bracket 6 which is rigidly bolted to the axle 2; and the points of pivotal support, 5—5, are considerably offset to one side of the longitudinal axes of the springs 3—3 for a purpose which will be presently explained. The outer ends of the levers 4 are operatively connected to the opposing central part of the main-spring body assemblage by the flexible straps 7—7 and the clamps 8—8—10. The outer conjoined extremities of the main spring 1 and the supplemental springs 3, 3, are preferably connected to the reversed axle perches 11—11 by means of the guide links 13, 13, which are so proportioned and positioned that their ends travel in an arc that is substantially coincident—for a considerable part of its length—with the free path of movement of the conjoined spring eyes as the spring members are oscillated and increasingly flexed—i. e., straightened out—by the relative movements of the body and axle parts toward or away from each other. The axle bracket 6 is also provided with a bumper 14 of rubber, or other suitable material, which will engage with the main spring body clamp 10 when the system is subjected to abnormal compression, and will thus serve to prevent the main spring from coming into direct contact with the arms of the said bracket. But neither the guide links 13, 13 or the bumper 14 are essential to the proper functional action of the series connected spring combination which operates as follows:

In the normal load position of the parts—shown in Fig. 1—the lever frames 4, 4, rest on the axle 2, and the flexible strap connections, 7, 7, are so adjusted in length as to free from slack. Under these conditions the normal load on the body frame is transmitted through the flexible main spring 1, to the ends of the supplemental springs 3, 3, and these series-connected springs are cooperatively flexed—in substantially the same manner as the two sides of a full elliptic spring are flexed—until the elastic strain therein balances the imposed stress;—the supplemental spring elements being preferably of such initial form as to maintain the parts in static equilibrium when the guide links 13—13 (if used) are slightly inclined downwardly. When the system is subjected to compression shocks the body and axle parts are forced toward each other; and the series connected main and supplemental springs are then simultaneously subjected to progressively increased flexures—which flattens them out to the form indicated by the dotted lines c—c—c of Fig. 1—until the augmented elastic resistances of these elements checks the approach movement. During this phase of the operation the connections 7—7 are loose and inactive; but as soon as the parts again return or recoil to normal load position, the said connections are subjected to tension; and if the body and axle parts rebound or separate beyond this position—i. e., move toward the expanded or supernormal positions r, r, of Fig. 2—the pull of these tensioned straps positively rotate the levers, 4, 4, on their offset axle supports 5—5—6, and the magnified upward movement of the outer extremities of the supplemental springs 3, 3, produces a progressively increased flexure of these units which is transmitted to, and balanced against, the concurrently flexed main spring 1. The expansion movement—like the compression movement—is therefore resisted and restrained by the cooperatively increased positive bending, and straightening out, of the initially bowed leaf springs 1, 3, 3; and these elastic units again act in series in checking the rebound of the system above, or beyond, the position of static equilibrium. The combined arcuate and longitudinal movements of the supplemental spring ends—as these auxiliary suspension elements swing upward and outward on the offset axes, 5, 5, and straighten out under the effect of increased flexure—coincide with the normal flexural movements of the adjacent ends of the main spring 1 as the latter is also moved upward and flattened out; and the end connected system of units, 1—3—3, is thus enabled to act—in both rebound and compression—like a very flexible full elliptic spring.

The construction illustrated in Fig. 3 is structurally analogous to that shown in Figs. 1 and 2; and differs from the latter only in such details as are attendant on its use in conjunction with the rear axle mounting of the car. In this utilization of my improved suspension system the supplemental spring-lever units $3^a$—$4^a$ are pivotally mounted, at $5^a$—$5^a$, on a saddle member $6^a$ which rests upon, and is bolted to, the top of the differential gear case of the rear axle housing; and these levers are coupled to the superimposed body member by the collapsible and adjustable link and turn buckle connections, $7^a$—$7^{aa}$, and the pintle blocks $8^a$—$8^a$. The outer connected ends of the main and supplemental springs 1—$3^a$—$^a$ are preferably guided in their curved path of movement by suitable links $13^a$—$13^a$ which are rockably supported on flexible brackets 16—16 that are bolted to the brake drum cases at the ends of the rear axle housing 2. The operation of this rear axle spring system is the same as that of the front axle spring support previously described and does not therefore require further explanation. The full lines of Fig. 3 show the relative positions of the parts when the system is subjected to normal load stress; and the dotted line positions c—c—c and r—r—r, at the right and left sides of the figure, diagrammatically illustrate the positions, and the concurrently increased flexures, of the series connected main and supplemental springs when the system is subjected to increased kinetic load and to rebound or expansion stresses respectively.

When the organizations shown in Figs. 1, 2 and 3 are used as cross leaf spring supports—as here shown—all lateral or sidewise sway of the body and main spring with respect to the running gear, is positively prevented by the longitudinal rigidity of the supplemental spring-lever units 3—4 (or $3^a$—$4^a$) and the axially fixed pintle connections between these parts and the main spring and axle members. When the spring connected members are subjected to rebound or expansion stresses the transverse bracing action of the increasingly flexed and stiffened suspension spring members, 3—4 ($3^a$—$4^a$) is further supplemented by the symmetrically opposed tensions in the oppositely inclined connections 7 (or $7^a$—$7^{aa}$) that exert a continuously increasing restraint on any sidewise displacement of the expanding members. If the end guide links 13 (or $13^a$) are employed these members cooperate with the supplemental spring elements 3, 4, and 7 (or $3^a$—$4^a$—$7^a$—$7^{aa}$) in always maintaining the body in centered relationship on the running gear supports; and also serve to prevent any transverse or fore and aft displacement or twisting, of the ends of the suspension springs with relation to the axle perch members 11 (or 16). These guide links further serve to limit and prevent any very extreme or excessive rebound or expansion of the suspension systems, because any displacement of the parts beyond the positions $r$—$r$ (Fig. 2 or 3) involves a sensible movement of the ends of the said links away from the normal paths of movement of the connected leaf spring eyes; and the further separation of the body and axle members is thereafter powerfully resisted and almost immediately arrested by the direct endwise pull of the rigid connections 13 (or $13^a$) on the vertically flexible, but longitudinally stiff sides of the main spring member 1.

The purpose of offsetting the pivotal supports 5 (or $5^a$) with respect to the longitudinal axes of the supplemental springs 3 (or $3^a$) is to increase the range or extent of substantial coincidence between the normal flexural movements of the series connected eye ends of the spring units 1 and 3 (or 1—$3^a$); and to likewise increase the possible range of vertical swinging movement of the conjoined guide links 13 (or $13^a$). This range of guide link movement may be still further extended, if desired, by making use either of the spring bracket 16 (as shown in Fig. 3), or of the transversely rigid, but longitudinally flexible spring shackle links 13', one of which is shown in Fig. 4. The employment of either one of the last mentioned devices avoids the necessity of any nice adjustment, or positioning, of the link supports 11 (or 16); and the use of the spring-shackle form of link (Fig. 4) is particularly advantageous in connection with certain applications of my improvements to very close built chassis frames, in which the body and axle parts are so close together that the pivot supports of the supplemental springs cannot be sufficiently offset from the longitudinal axes of the springs to obtain a symmetrical arcuate movement of their outer ends on the two sides of normal load position.

The organization depicted in Fig. 6 is quite similar in form to the two previously described exemplifications of my invention; but as here shown this compound series spring system is arranged as a side leaf spring support for the rear axle of a motor vehicle. In this case the longitudinally disposed main spring $1^s$ is rigidly attached, at its center, to the axle bracket or housing $8^b$; and is pivotally connected, at its outer extremities, to the eye ends of the two supplemental leaf springs $3^b$ $3^b$. These auxiliary suspension elements are bolted at their inner ends to L-shaped lever frames $4^b$ $4^b$; and the latter are mounted, as before, on transverse pivots $5^b$ $5^b$ that are considerably to one side of the longitudinal axes of the leaf springs $3^b$ $3^b$. The outer ends of the levers $4^b$ are coupled to the axle bracket $8^b$ by means of the flexible "one way" strap connections $7^b$, $7^b$, which are adjustably secured to the said bracket by the clamp plates $10^b$, $10^b$. The pivot bolts $5^b$ $5^b$ are carried by a V-shaped frame $6^b$ that is bolted to the body sill of the car; and the lower side of this frame may be apertured, if desired, to receive a buffer block $14^b$ of rubber or other suitable material.

In the normal load position of the parts the upper edges or sides of the supplemental spring-lever units $3^b$ $4^b$ are in engagement with the lower face of the body sill; and the connections $7^b$ $7^b$ are adjusted until they are under a slight tension. When the system is compressed, by a kinetic increase in load, the series connected springs $1^s$—$3^b$—$3^b$ are increasingly flexed and concurrently flattened out, like the two sides of an ordinary full elliptic leaf spring, (as shown by the dotted lines $c$—$c$—$c$ at the right of Fig. 6); but in this phase of the operation the connections $7^b$ $7^b$ are inactive, and the lever members $4^b$ $4^b$ remain fixed in position on the body support $6^b$. When the body and axle parts are separated beyond normal load position—by a rebound or expansion stress—the connections $7^b$ $7^b$ rotate the levers $4^b$ $4^b$ on the offset pivot supports $5^b$ $5^b$; and the accelerated downward movements of the supplemental springs $3^b$ $3^b$ relatively to the main spring $1^s$, tend to impose concurrently increased flexures on these series connected suspension elements. During this rebound movement, the bodily angular displacements of the lever-spring members, $3^b$—$4^b$, on the offset centers of rotation, $5^b$ $5^b$, serve to maintain the eye ends of the shorter, but more severely flexed, supplemental springs in substantially fixed relation to the extremities of the longer and stiffer—and therefore less strongly bent—main spring $1^s$; and the unequally distorted elastic support members, are thus permitted to again coact and cooperate in much the same manner as the symmetrically proportioned sides of a full elliptic spring (as indicated by the dotted line positions R—$r$—$r$ at the left of Fig. 6).

The longitudinal rigidity of the leaf spring elements $1^s$—$3^b$—$3^b$ serves to hold the axle members $2$—$8^b$ in transversely centered relationship to the body parts $5^b$—$6^b$—$5^b$; and thus prevent any endwise swaying or pitching of the tonneau on the running gear supports. In this respect also, my improved double acting combination of series connected leaf springs act like a full elliptic spring; but it is even more effective and efficient than the latter, in resisting and preventing "fore and aft" movements, because a rebound or vertical separation of the body and axle members increases the flexure and therefore the longitudinal stiffness of the auxiliary springs (as well as that of the main spring $1^s$), and also increases, to a still greater degree, the longitudinal bracing and centering action of these oppositely and symmetrically inclined supports $3^b$ $3^b$.

Figs. 7, 8 and 9 illustrate another utilization of my invention in conjunction with the ordinary semi-elliptic side leaf spring support for the front axle of a motor vehicle. In this construction the outer end of the main spring $1^s$ is pinned, as usual, to the front horn B of the vehicle body; and the forward portion of the primary suspension member therefore acts as a radius rod to hold the axle 2 in longitudinal relationship to the tonneau frame. The shackle links ordinarily employed to support the inner or rear end of the main spring $1^s$ are removed; and this end is pivotally connected to the adjacent eye of a flexible supplemental leaf spring $3^c$, that is bolted, at its opposite extremity, to a rigid lever frame $4^c$. This lever is mounted on an offset pivot bearing $5^c$ which is carried by the body bracket $6^c$; and is coupled, at an intermediate point in its length, to the axle frame, by means of the flexible and adjustable "one-way" strap connection $7^c$. The pintle connections for the coupled ends of the main and supplemental springs, $1^s$—$3^c$, consist of flat headed male and female screws, 18—19; and these coupled ends are slidably engaged and guided by a slotted bracket $13^c$, which is rigidly bolted to the body frame, and which may, if desired, be transversely braced, at its lower part, by a cross bolt 20 that extends to the corresponding bracket on the opposite side of the chassis. When the parts of this system are in normal load position the upper side of the frame $4^c$ rests against the body sill, and the strap $7^c$ is adjusted in length—under the clamp plate $10^c$—until it has a slight initial tension.

The operation of this single supplemental spring suspension is essentially the same as that of the twin spring constructions previously described. When the system is subjected to a kinetic increase in load the lever-spring unit $3^c$—$4^c$ is held in fixed relation to the body bracket $6^c$; and the relative approach of the axle and main spring, $2$—$1^s$, toward the body frame, imposes a concurrently increased flexure on the series connected springs $1^s$—$3^c$, and flattens them out to the form shown in the dotted lines C—$c$—$c$ of Figs. 7 and 8. When the body and axle parts are separated beyond normal load position the lever frame $4^c$ is rocked in a clockwise direction, on its offset pivot support, $5^c$, by the pull of the strap $7^c$; and the suspension elements are moved from the full line position of Fig. 7 toward that shown in Fig. 8. This positive angular movement of the unitary lever-spring members, $4^c$—$3^c$, produces a balanced concurrent increase in the normal flexure of the series connected springs 1—$3^c$, and thus imposes a progressively and rapidly augmented resistance to any expansion of the elastic support system beyond normal load position. The primary spring $1^s$ and the secondary lever supported spring $3^c$ act, in this case, like a very sensitive three-quarter elliptic spring unit in absorbing and checking both compression shocks and rebound stresses.

The free oscillatory movement of the inner connected ends of the spring elements (from the positions $n$ to $c$ and $n$ to $r$ respectively) is restricted to a vertical plane by the guide block $13^c$ which thus cooperates with the transversely rigid lever and lever support elements, $4^c$—$5^c$—$6^c$, in preventing a side sway or transverse displacement of the main spring and axle members, $1^s$—2, with respect to the body of the vehicle. This slotted guide frame may also act as a stop to limit the free vertical oscillation of the concurrently flexed suspension elements and thus prevent the fracture or permanent distortion that might result from a very excessive or abnormal displacement strain. When the connected eye ends of the spring elements come in contact with the upper or the lower ends of the guide frame the resistance of one or the other of the elastic supports—to further relative movement of the body and axle parts—is substantially increased, and the further movement of the parts in this same direction is therefore quickly and effectively checked before the bending strain on the springs can reach the danger point. The member 13$^c$ of the last described construction therefore performs the same general functions as the correspondingly designated parts 13 or 13$^a$ or 13' of Figs. 1, 2, 3 and 4.

Figs. 10 to 13, inclusive, depict another series combination of main and supplemental springs which embodies many of the generic characteristics of my present invention. In this combination the secondary suspension unit comprises two supplemental leaf springs 3$^d$ and 3$^{dd}$ which are bolted rigidly to a single lever support 4$^d$ that is flexibly attached to the axle bracket 6$^d$ by means of the shackle links 5$^d$. The inner end of the main spring 1$^s$ is pinned to the body bracket B, and its opposite extremity is connected in series, as before, with the adjacent end of the supplemental spring 3$^d$ by means of the pintle bolts 18$^d$—19$^d$ and the lower side bars of the vertically flexible guide link assemblage 13$^d$—13$^{dd}$. The second auxiliary spring 3$^{dd}$ is connected at its eye end with the body bracket B by the shackle connection 22. The lever support 4$^d$ is coupled to the body frame by the flexible oneway strap connection 7$^d$ and the adjustable clamp 10$^d$; and the outer end of this clamp is also provided with a bearing plate 24, that is adapted to engage a roller 25 on the adjacent extremity of the said lever, and thus hold this extremity—and the attached base of the supplemental spring 3$^d$—in fixed relationship to the body when the parts are in the normal load position N—n shown in Fig. 10.

When this system is subjected to a kinetic increase in load the body and axle members are pressed toward each other, from the full line position N—n of Fig. 10 toward the positions C—c—c, (indicated in dotted lines in Fig. 10 and partly shown in full lines in Fig. 11); and the main and supplemental springs 1$^s$—3$^d$—3$^{dd}$ are all subjected to balanced concurrent increases in flexural strain which serve to quickly arrest the vertical approach of the spring suspended parts. In this movement the base of the supplemental spring 3$^d$ is held in substantially fixed position with respect to the body of the vehicle (by the engagement of the parts 24—25) but the connected outer ends of the main and supplemental springs, 1$^s$—3$^d$, are permitted to move freely in a vertical plane, by the folding up of the elbow link frame 13$^d$—13$^{dd}$, until the edges of the upper links 13$^{dd}$ engage with the lower inset portions of the links 13$^d$ (see Fig. 11). During this movement the primary suspension elements 1$^s$ and the superimposed secondary suspension member 3$^d$, act like a three-quarter elliptic spring unit; but the auxiliary leaf spring 3$^{dd}$ is concurrently moved away from the lower spring 1$^s$, or toward the body frame B, and is subjected to progressively increased flexure (as shown in dotted lines at the left of Fig. 10) until it is ultimately brought into engagement, at the median portion of its length, with the said body frame.

The length of the strap 7$^d$ is so adjusted that this connection is preferably under a slight tension when the parts of the system are in static equilibrium. If, under such circumstances, the body and axle parts are separated beyond this normal position the pull of the strap 7$^d$ on the lever 4$^d$ rocks the latter in a clockwise direction on its axle support, 5$^d$—6$^d$; and this angular movement again subjects the series connected springs 1$^s$—3$^d$ to concurrently imposed transverse stresses that move them downward—and simultaneously increase their normal flexure and reactive resistance—until the arms, 13$^d$—13$^{dd}$, of the guide link frame have been straightened out (as shown in Fig. 13) and the further movement in this direction has thus been arrested. The clockwise rotation of the lever member 4$^d$ also subjects the auxiliary leaf spring 3$^{dd}$ to a progressively increased bending strain that cooperates with the concurrently imposed strains in the other two springs, 1$^s$, 3$^d$, in resisting and checking the rebound or expansion of the suspension system.

The oscillatory movement of the outer ends of the springs 1$^s$—3$^d$—within the limits above indicated—is restrained to a vertical plane by the transverse rigidity or stiffness of the elbow frame 13$^d$—13$^{dd}$, which thus serves the same purpose as the links or guides, 13*****13$^c$, in preventing lateral sway or transverse displacement of the body on its running gear supports. This transverse bracing effect of the guide frame may be augmented, if desired, by extending either one of the pintle bolts, 18$^d$ or 19$^d$—as indicated at 20$^d$, Fig. 12—to the corresponding pintle element of the suspension system for the opposite side of the vehicle body.

When the series connected springs of any one of the above described organizations are strongly flexed—either by compression or expansion stresses—their progressively increased elastic resistances tend to produce a violent recoil or return of the parts to normal load position as soon as the distortion stress is removed or abated. It is desirable to restrain or "damp" this quick recoil action, and in my present improved construction I effect this result by building up the supplemental spring elements from a relatively large number of individually thin and flexible leaves—instead of from a small number of thicker leaves—and holding these leaves in close frictional engagement with each other by a plurality of spring clips such as are indicated at 15, 15, etc. When these plural leaf springs are flexed the leaves move longitudinally with respect to each other; and the frictional engagement between the superimposed surfaces slows down the period of elastic oscillation, and thus retards the normally free reaction movements of the separate leaf elements. In order to still further augment this frictional damping restraint I may, in some cases, form the spring leaves from longitudinally corrugated strips, such as are shown in transverse cross-section in Fig. 5; thereby increasing the area of contact, and the resistance to slip, between the engaging surfaces of the flexible elements.

It will be observed, by those skilled in this art, that all of the previously considered embodiments of this invention present, in common, a number of mechanical and functional characteristics—e. g., such as have been briefly outlined in the opening paragraphs of this specification—and, with the preceding disclosure as a guide, engineers, and others familiar with the use of spring suspension systems, will be enabled to appreciate and utilize the characteristic features and advantages of my improvements, and to incorporate them in many other forms and modifications of the hereinbefore described organizations. These organizations are, therefore, to be regarded as only illustrative ones, and are not to be considered as either delimiting, or as fully delineating, the scope of application of the present invention. But as previously stated the special forms of construction to which this application relates exemplify only one species of a general type that is more fully described in my copending applications Ser. Nos. 400,256 and 591,708, filed July 30, 1920 and Oct. 2, 1922 respectively, and I do not, therefore, now claim the broader features of the invention as set forth in those earlier disclosures; but I do claim specifically:

1. In a spring suspension system the combination of two series-connected leaf springs interposed between the spring supported members and a "one-way" connection attached at one end to one of said members, and at the other end to an intermediate part of one of said springs, substantially as described.

2. In a spring suspension system for two relatively movable members the combination of a main spring attached to one member, a supplemental leaf spring pivotally supported on the other member and connected in series with one end of the said main spring, and a flexible connection secured at one end to one of the said members and at the other end to an intermediate part of the said supplemental spring.

3. In a spring suspension system for vehicles the combination of a plurality of series-connected leaf springs interposed between the body and axle members of the vehicle and an adjustable "one way" connection between one of said members and an intermediate part of one of said leaf springs.

4. In a spring suspension system for a vehicle chassis the combination with a main leaf spring, of a supplemental leaf spring unit interposed between one end of the main spring and that part of the chassis to which said end is ordinarily attached and comprising, a secondary leaf spring, a pivot support therefor, and a one way connection between an intermediate portion thereof and an adjacent part of the vehicle chassis.

5. A spring suspension system for vehicles which comprises a main leaf spring, a secondary leaf spring connected in series with one end of the main spring, an offset pivot supported for this secondary spring, and a flexible strap attached at one end to an intermediate part of the said secondary spring and adjustably secured at the other end to one of the vertically oscillating members of the vehicle.

6. In a spring suspension system for the body and axle members of a vehicle the combination of a main spring, a supplemental leaf spring pivotally connected at one end to the said main spring and pivotally supported at the other end on one of said members, a one-way connection between an intermediate part of said supplemental spring and the other of said members, and a guide element engaging the pivotally connected parts of the said springs and acting to resist any lateral displacement of the said parts from the plane of the system.

7. In a spring suspension system for vehicles the combination of a main leaf spring, a supplemental leaf spring flexibly coupled at one end to the said main spring and rigidly attached at the other end to a lever, a pivot support for the said lever which is laterally offset from the longitudinal axis of the said secondary spring, and a one way connection between the said lever and one of the mutually oscillating parts of the vehicle chassis.

8. In a spring suspension system for two relatively movable members the combination of a plurality of leaf springs flexibly coupled in series with each other, an offset pivot support for the base of one of said springs, means for holding this pivotally supported base in fixed relation to the said support when the relatively movable members are forced toward each other, and other means for rocking this same spring on the said pivot support when the said members are separated beyond the position of static equilibrium.

9. A spring suspension system for a vehicle chassis which comprises the combination of a main leaf spring, a supplemental leaf spring flexibly connected to one end of the said main spring, guide means embracing said end and acting to resist any displacement of the connected parts from the plane of the suspension system, an offset pivot support for the supplemental spring, means for maintaining said supplemental spring in fixed angular relation to its pivot support when the system is subjected to compression, and a connection between one of the vertically oscillating members of the vehicle chassis and an intermediate part of the secondary spring and acting to rock the latter on its pivot support when the system rebounds or expands beyond normal load position.

10. A spring suspension system for two relatively movable members which comprises a main leaf spring, a secondary leaf spring pivotally mounted on one of said members, a collapsible one-way connection between an intermediate part of the said secondary spring and the other of said members, means for flexibly conjoining one end of the main spring to an adjacent end of the secondary spring and a guide member embracing said flexibly conjoined ends and acting both to prevent lateral displacement of the parts from the plane of the suspension system and also to limit the vertical oscillation and the flexural distortion of the said springs.

11. A spring suspension system for vehicles which comprises a main leaf spring, a supplemental leaf spring operatively connected in series therewith, an offset pivot support for the base of the supplemental spring, a collapsible one-way connection between one of the vehicle members and an intermediate point of said supplemental spring, and an elastic buffer block interposed between the relatively inelastic parts of the spring system and acting to limit the approach movement of the body and axle members of the vehicle.

12. A spring suspension system for vehicles which comprises a main leaf spring in combination with a supplemental leaf spring connected in series therewith, means conjoining the body and axle members of the vehicle with the more rigid portions of the said springs and acting to impose progressively increased flexures on the more flexible portions thereof whenever the said members are moved in either direction from normal load position; and a guide member engaging with the series connected parts of the said springs and operating to restrain and limit the movement thereof in the plane of the suspension system.

In testimony whereof I have hereunto set my hand.

FRANK L. O. WADSWORTH.